(12) United States Patent
Major et al.

(10) Patent No.: US 10,945,048 B2
(45) Date of Patent: Mar. 9, 2021

(54) METHODS AND APPARATUS FOR PRESENTING ADVERTISEMENTS DURING PLAYBACK OF RECORDED TELEVISION CONTENT

(71) Applicant: ECHOSTAR TECHNOLOGIES L.L.C., Englewood, CO (US)

(72) Inventors: Robert Drew Major, Orem, UT (US); Mark B. Hurst, Cedar Hills, UT (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/394,355

(22) Filed: Dec. 29, 2016

(65) Prior Publication Data
US 2017/0188116 A1 Jun. 29, 2017

Related U.S. Application Data

(60) Provisional application No. 62/272,425, filed on Dec. 29, 2015.

(51) Int. Cl.
| | |
|---|---|
| *H04N 21/81* | (2011.01) |
| *H04N 21/4147* | (2011.01) |
| *H04N 21/454* | (2011.01) |
| *H04N 21/431* | (2011.01) |
| *G06Q 30/02* | (2012.01) |
| *H04N 21/433* | (2011.01) |

(Continued)

(52) U.S. Cl.
CPC ....... *H04N 21/812* (2013.01); *G06Q 30/0251* (2013.01); *H04N 21/4147* (2013.01); *H04N 21/4316* (2013.01); *H04N 21/4334* (2013.01); *H04N 21/454* (2013.01); *H04N 21/47217* (2013.01); *H04N 21/482* (2013.01); *H04N 21/6582* (2013.01); *H04N 21/8153* (2013.01)

(58) Field of Classification Search
CPC ............ H04N 21/812; H04N 21/4147; H04N 21/4316; H04N 21/4334; H04N 21/454; H04N 21/47217; H04N 21/482; H04N 21/6582; H04N 21/8153; G06Q 30/0241
USPC ......................................................... 725/38
See application file for complete search history.

(56) References Cited

U.S. PATENT DOCUMENTS

| | | | | |
|---|---|---|---|---|
| 5,925,100 A | * | 7/1999 | Drewry | ............... G06F 9/44521 348/E5.002 |
| 8,903,894 B2 | * | 12/2014 | Dillon | ............... G06F 17/30902 709/202 |

(Continued)

OTHER PUBLICATIONS

European Patent Office International Searching Authority, International Search Report and Written Opinion for International Application No. PCT/US2016/069274 dated Mar. 21, 2017.

*Primary Examiner* — Alfonso Castro
(74) *Attorney, Agent, or Firm* — Lorenz & Kopf LLP

(57) ABSTRACT

A method for operating a programming receiver is provided. The method displays, by the programming receiver, a sequence of recorded video content comprising a video presentation and a plurality of segments of interstitial content; receives, at the programming receiver, a command to skip one of the plurality of segments of interstitial content; and presents a screen comprising a picture advertisement for the one of the plurality of segments of interstitial content, the screen requesting confirmation to skip the one of the plurality of segments of interstitial content in the sequence.

13 Claims, 12 Drawing Sheets

(51) Int. Cl.
*H04N 21/472* (2011.01)
*H04N 21/482* (2011.01)
*H04N 21/658* (2011.01)

(56) References Cited

U.S. PATENT DOCUMENTS

| | | | |
|---|---|---|---|
| 2008/0152300 A1* | 6/2008 | Knee | G11B 27/005 |
| | | | 386/250 |
| 2010/0186032 A1 | 7/2010 | Pradeep et al. | |
| 2010/0228611 A1* | 9/2010 | Shenfield | G06Q 30/02 |
| | | | 705/14.4 |
| 2012/0057848 A1* | 3/2012 | Casagrande | H04N 5/76 |
| | | | 386/245 |
| 2013/0086607 A1 | 4/2013 | Tom et al. | |
| 2013/0101272 A1 | 4/2013 | Plotnick et al. | |
| 2013/0263180 A1* | 10/2013 | Yang | H04N 21/25891 |
| | | | 725/32 |
| 2013/0291009 A1* | 10/2013 | Israel | G06F 17/30038 |
| | | | 725/32 |
| 2014/0006951 A1* | 1/2014 | Hunter | H04H 60/31 |
| | | | 715/719 |
| 2014/0143800 A1* | 5/2014 | Arankalle | G06Q 30/02 |
| | | | 725/32 |
| 2014/0150019 A1* | 5/2014 | Ma | G06Q 30/0251 |
| | | | 725/34 |

* cited by examiner

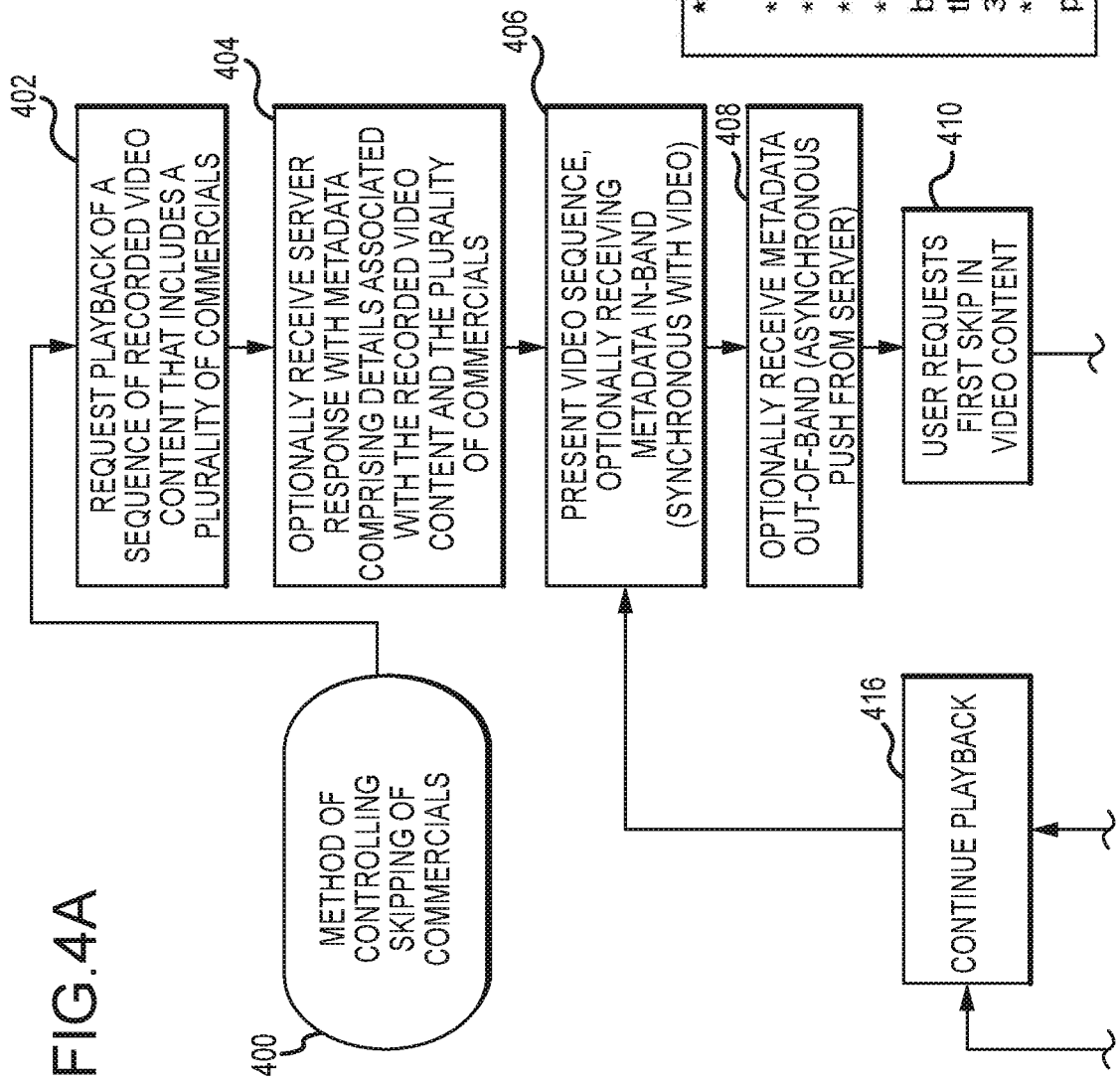

METHODS AND APPARATUS FOR PRESENTING ADVERTISEMENTS DURING PLAYBACK OF RECORDED TELEVISION CONTENT

CROSS-REFERENCE TO RELATED APPLICATION(S)

This application claims the benefit of U.S. provisional patent application Ser. No. 62/272,425, filed Dec. 29, 2015.

TECHNICAL FIELD

Embodiments of the subject matter described herein relate generally to the presentation of advertising content. More particularly, embodiments of the subject matter relate to user selection of advertising content to be viewed during playback of recorded video content.

BACKGROUND

Using recording technology, users are able to record broadcast television and watch the time-shifted video content, in its entirety, at the convenience of the user. Video content may include broadcast television shows, movies, sporting events, or anything that the user chooses to record. Users may elect to "skip" (i.e., omit or exclude) commercials during playback of recorded video content, often using fast-forwarding or skipping technology that allows video playback to move past a set of one or more commercials to the next segment of recorded video content. In such a case, the user may or may not know which commercials were skipped, and may have missed a commercial of particular interest to the user, which the user may have wished to view.

Accordingly, it is desirable to provide sufficient information to the user, such that the user may decide which commercials or advertisements to watch. In addition, it is desirable to provide a mechanism by which advertisers may present a product or brand to a user, even when the user has decided to skip the commercial. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 4A-4C is a flow chart that illustrates an embodiment of a process for controlling skipping of commercials;

DETAILED DESCRIPTION

Figure 1:
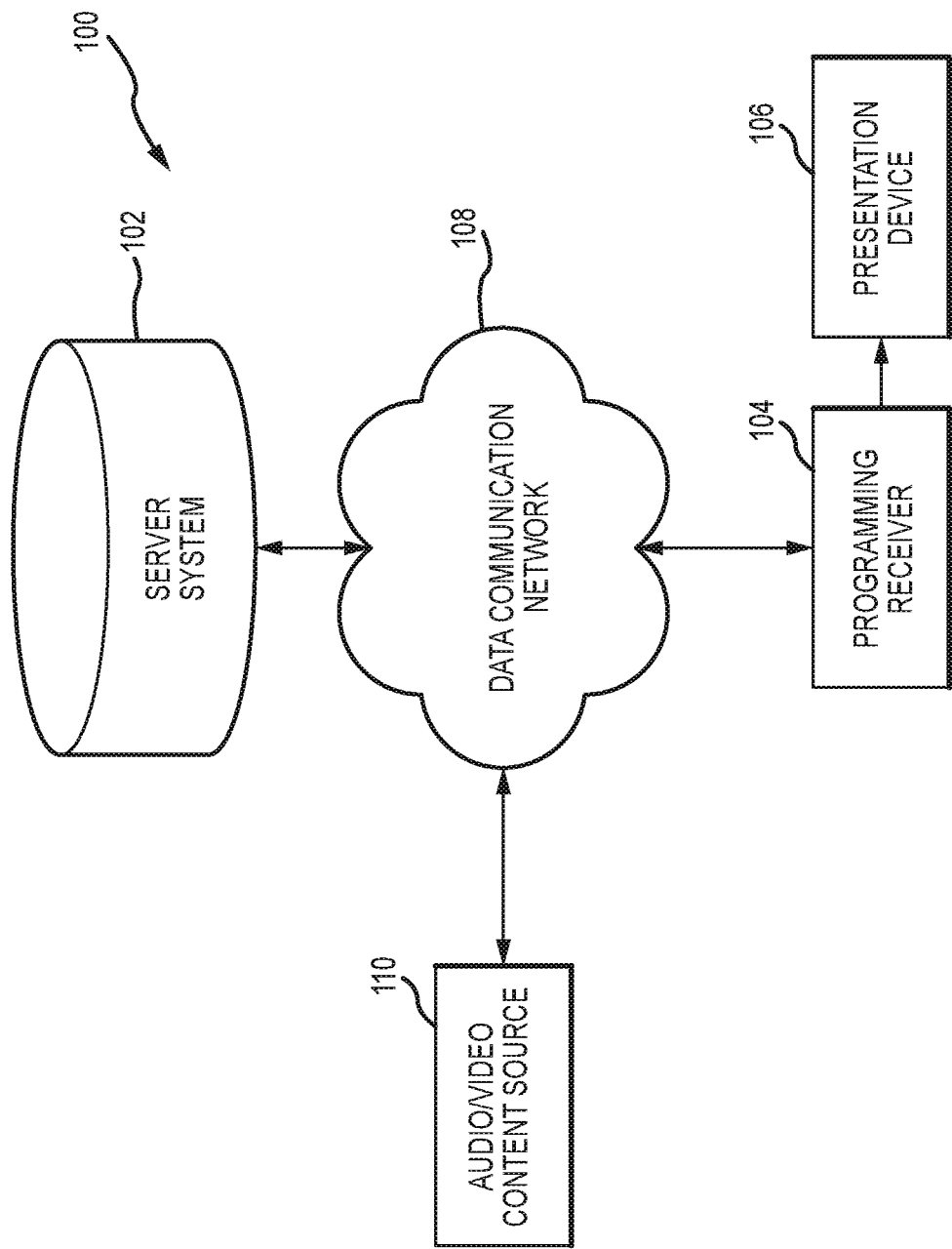
FIG. 1 is a schematic representation of an advertisement presentation system, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for allowing a user to select interstitial content (e.g., commercial advertisements) for viewing during playback of recorded video content, and drawing the attention of a user to an auxiliary media object. The auxiliary media object may include, without limitation, a single-screen "slate" that is still-frame or animated, and which may include a picture advertisement associated with the brand or product associated with the commercial. that includes a mechanism for the user to confirm or decline watching each recorded segment of interstitial content. Certain terminologies are used with regard to the various embodiments of the present disclosure. Video content or a video presentation may include broadcast television shows, movies, sporting events, or anything that the user chooses to record. Interstitial content may be anything other than the "main program" or video presentation, e.g., one or more advertisements, a commercial break, a preview, a trailer, or the like. Recorded video content is any video content that has been digitally stored in memory, such as that recorded using a digital video recorder (DVR) and/or remote storage digital video recorder (RSDVR). A sequence of recorded video content may include segments of a television show and one or more television commercials presented according to a chronological order of the show. A television commercial may also be referred to as a television advertisement, a commercial, or an ad. Commercials are short marketing presentations used to promote a product or service, and are usually presented between segments of a television broadcast presentation.

In exemplary embodiments, a player device (e.g., set-top box, cable box, satellite receiver) streams video from either a local device or over the Internet. This video stream includes recorded content from a local digital video recorder (DVR), from a remote storage DVR (RS-DVR), or any other pre-recorded content source. The video stream includes built-in television advertisements or the video stream is marked (typically with SCTE 35 ad markers) where advertisements are to be inserted (by switching to another video stream containing the advertisement).

When the player device gets "close" to where an ad or ad marker is located, the player device requests and receives notification of the location(s) of the ads embedded within the upcoming video stream (precise start and ending points). The player device is also given a URL defining an auxiliary media object (e.g., a picture or extremely short video clip (advertisement identity banner)) for each upcoming ad which is to be displayed in the case the viewer pushes the "skip" button. Upon receiving notice of the upcoming ads and advertisement identity banner, the player device prefetches the advertisement identity banners so that the advertisement identity banners will be immediately available when the viewer pushes the "skip" button.

If the view does push the "skip" button while video is playing a commercial or video advertisement, then the commercial playback is immediately stopped and replaced by the associated auxiliary media object (e.g., the identity banner picture or video clip). Thus, the viewer is notified of the identity of the commercial or advertisement the user is about to skip. After a short period of time (a second or two), if the viewer pushes the "skip" button again, the complete commercial is skipped and the next commercial's associated auxiliary media object (e.g., identity banner picture or video clip) is displayed.

If the viewer continues to "skip" the ads or commercials during recorded video playback, eventually the complete set of commercials has been skipped, and playback resumes precisely at the end of the last commercial. If, however, the viewer does not push the "skip" button on an identified commercial or ad, then after a slightly longer period of time (maybe three seconds) the video ad either restarts at the point where it was previously stopped, or is started at the beginning (if never seen). After the commercial is restarted, if the viewer pushes "skip" again, the recorded video content goes back to where things started at the previous paragraph.

When the auxiliary media object (e.g., ad identification banner picture or video clip) is displayed, the player device begins pre-fetching the video ad stream, with the assumption that the viewer may want to see it. If the viewer pushes "skip" before the commercial or ad started to play, the pre-fetched video ad stream is discarded and the player devices starts pre-fetching the next video ad stream.

Effectively, this mechanism makes the player "skip" function, which normally just skips ahead thirty (30) seconds, more intelligent and useful to the user when used when a commercial or ad is being displayed. The skip now lands on commercial and next-content boundaries. The viewer is also shown what he or she is selecting to skip, thus enabling the viewer to choose which ads he or she wants to watch.

Turning now to the figures, FIG. 1 is a schematic representation of an advertisement presentation system 100, in accordance with the disclosed embodiments. As shown in this particular embodiment, the advertisement presentation system 100 includes a server system 102 in communication with a programming receiver 104. Here, the programming receiver 104 is used cooperatively with a presentation device 106 to provide a user with a display of video content. The video content is communicated from an video content source 110 to a plurality of programming receivers 104 via the data communication network 108, fiber, internet, wireless, or cellular networks, and/or off-air, satellite, or cable broadcasts. The programming receiver 104 may be configured to record received video broadcast content, and may comprise Digital Video Recorder (DVR) technology and/or communicate with remote storage digital video recorder (RSDVR) accessible via a data communication network 108.

Each programming receiver 104 may include or cooperate with a suitably configured presentation device 106, and each programming receiver 104 produces output that is communicated to a presentation device 106. The presentation device 106 may be implemented as, without limitation: a television set; a monitor; a computer display; a portable electronic device; or any suitable customer appliance with compatible display capabilities. In various embodiments, each programming receiver 104 is a conventional set-top box commonly used with satellite or cable television distribution systems. In other embodiments, however, the functionality of a programming receiver 104 may be commonly housed within a presentation device 106. In still other embodiments, a programming receiver 104 is a portable device that may be transportable with or without the presentation device 106. A programming receiver 104 may also be suitably configured to support broadcast television reception, video game playing, personal video recording and/or other features as desired.

During typical operation, the programming receiver 104 receives video content, signaling information, and/or other data via the data communication network 108, fiber, internet, wireless, or cellular networks, and/or off-air, satellite, or cable broadcasts. The programming receiver 104 then demodulates, descrambles, decompresses, and/or otherwise processes the received digital data, and then converts the received data to suitably formatted video signals that can be rendered for viewing, and/or stored for future viewing, by the customer on the presentation device 106. The programming receiver 104 is further configured to provide functionality for a user to omit (i.e., exclude) selected portions of recorded video content, such as television commercials. In this scenario, the programming receiver 104 may permit a user to fast-forward through a recorded commercial; to perform a "skip" function that immediately moves a sequence of video content forward, during playback, by a predefined period of time; and/or to skip an entire commercial, from beginning point to the ending point, and resume video content playback at the point in time where the commercial has ended.

In particular implementations of the advertisement presentation system 100, the programming receiver 104 may be implemented as a specialized, remote control software application (i.e., "remote control app") deployed on a computing device, such as a smartphone, tablet, or "smart" television. In some embodiments, the remote control app is used cooperatively with an external presentation device 106, and includes functionality associated with the programming receiver 104. This functionality may include, without limitation: changing channels, controlling personal video recorded (PVR) and/or digital video recorder (DVR) recordings, viewing electronic program guide data and/or other available features. However, certain embodiments of the remote control app may include the functionality and features of both of the programming receiver 104 and the presentation device 106. In this instance, the remote control app not only provides control functionality for programming on the computing device, but also provides functionality for viewing the programming on a display of the computing device. Thus, the video content may be controlled and viewed on one computing device.

The programming receiver 104 is capable of communicating with a centralized server system 102 via a data communication network 108. The programming receiver 104 and the server system 102 are generally disparately located. In various embodiments, a programming receiver 104 communicates with the server system 102 to identify currently-viewed television content and to provide still-frame, picture advertisements to a user upon receipt of a user command to skip a commercial or other segment of interstitial content. Program content and interstitial content may be identified from data in an electronic program guide provided by the server system 102. Alternatively, program content and interstitial content may be identified based upon audio fingerprinting or other factor by communicating with the server system 102. After interstitial content is identified, a picture advertisement that is associated with the identified content can be identified and presented to the user via the presentation device 106.

The programming receiver 104 or remote control app is aware of the program content or interstitial content currently being viewed via the presentation device 106 or the remote control app interface, since the viewer uses the programming receiver 104 or remote control app to change channels, to select programs on a DVR/RSDVR, to obtain streaming video, or the like. Further, the programming receiver 104 or remote control app is aware of particular ads, commercials, or other interstitial content currently presented on any viewer displays. The programming receiver 104 or remote control app may obtain this information from one or more databases of the server system 102. Retrieval of electronic program guide data and/or audio fingerprinting, for example, may be used to identify currently-broadcast advertisements and other interstitial content so that appropriate single-screen, picture advertisements may be identified and presented to the user when the user has selected to skip, omit, or exclude the currently-playing interstitial content from video playback. In this example, the picture advertisement data may be provided to the programming receiver 104 even if the advertising content viewing is place or time shifted, since the information is associated with the interstitial content itself rather than the broadcast schedule.

The programming receiver 104 accesses one or more databases of the server system 102 to identify interstitial content viewed by a user. As noted above, interstitial content may be identified based upon program guide data, based upon audio fingerprinting of the actual program being viewed, or in any other manner. To that end, audio fingerprints or other identifying data about various programs, advertisements or other program contents could be stored at the server system 102.

The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 102 may include any number of application servers, and each server may be implemented using any suitable computer. In some embodiments, the server system 102 includes one or more dedicated computers. In some embodiments, the server system 102 includes one or more computers carrying out other functionality in addition to server operations. In exemplary embodiments, the server system 102 operates within a client-server architecture, executing programs to serve the requests of other programs (i.e., the clients). In this example, the programming receiver 104 acts as the client, and the server system 102 performs some tasks on behalf of programming receiver 104, to include using the source code to provide machine-readable execution instructions (e.g., machine code) and executing requested functions.

As described above, the server system 102 maintains at least one database of information that allows identification of programs (e.g., from audio fingerprints). The server system 102 additionally maintains a database of picture advertisements, logos, screenshots, or artistic renderings for the programming receiver 104 to access via the data communication network 108. A picture advertisement associated with a commercial or other interstitial content is appropriately delivered to the programming receiver 104 in response to a received query. Having thus received an identifier for currently-viewed inerstitial content, the programming receiver 104 is able to obtain the associated picture advertisement from the server system 102. Picture advertisements may be requested using conventional HTTP constructs, for example, or other interaction with the programming receiver. Server system 102 suitably provides the requested content and delivers it to the programming receiver 104 via data communication network 108, as appropriate.

Figure 2:
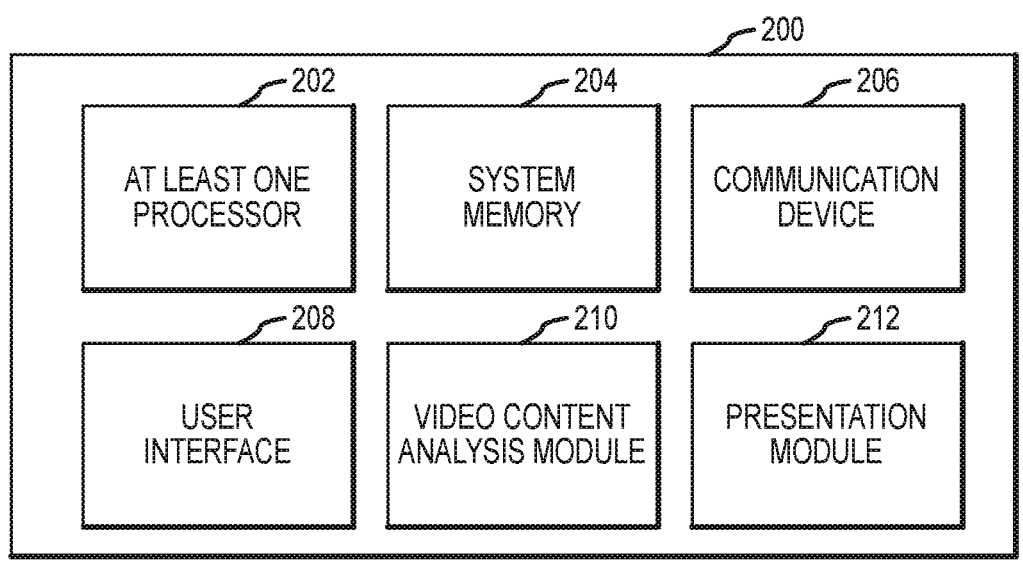
FIG. 2 is a schematic block diagram of a programming receiver, in accordance with the disclosed embodiments.

FIG. 2 is a schematic block diagram of a programming receiver 200, which is suitable for use in the advertisement presentation system shown in FIG. 1. The programming receiver 200 generally includes, without limitation: at least one processor 202; system memory 204; a communication device 206; a user interface 208; a video content analysis module 210; and a presentation module 212. These elements and features of programming receiver 200 may be operatively associated with one another, coupled to one another, or otherwise configured to cooperate with one another as needed to support the desired functionality—in particular, presenting advertisements as described herein. For ease of illustration and clarity, the various physical, electrical, and logical couplings and interconnections for these elements and features are not depicted in FIG. 2. Moreover, it should be appreciated that embodiments of the programming receiver 200 will include other elements, modules, and features that cooperate to support the desired functionality. For simplicity, FIG. 2 only depicts certain elements that relate to the advertisement presentation techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store various sets and of recorded video content, as is commonly associated with Digital Video Recorder (DVR) technology. Recorded video content includes broadcast television, movies, sports events, and any other video content interspersed with commercial advertisements. Each television presentation (e.g., television show, movie, etc.) may be referred to as a "sequence" of recorded video content, indicating that segments of video content and commercial advertisements are presented in a sequential order. The number of sequences (i.e., the number of video presentations) that may be stored in system memory 204 is dependent upon the size of the system memory 204 hardware.

The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to receive and perform processing on signals received by the programming receiver 200 and to transmit signals from the programming receiver 200. The communication device 206 is used to communicate data between the programming receiver 200 and one or more servers (see, for example, FIG. 1). As described in more detail below, data received by the communication device 206 may include, without limitation: video content provided by a television content provider source; recorded video content from a remote server digital video recorded (RSDVR); identification data, picture advertisements, and other related internet content data associated with television presentations and/or television commercials presented by the programming receiver 200; and the like. Data provided by the communication device 206 may include, without limitation: video content from a television content provider; identifying parameters of television presentations and/or television commercials stored on, and presented by, the programming receiver 200; and the like. The communication device 206 may leverage conventional design concepts that need not be described in detail here.

The user interface 208 may include or cooperate with various features to allow a user to interact with the programming receiver 200. Accordingly, the user interface 208 may include various human-to-machine interfaces, e.g., a keypad, keys, a keyboard, buttons, switches, knobs, a touch-pad, a joystick, a pointing device, a virtual writing tablet, a touch screen, a microphone, a remote control, or any device, component, or function that enables the user to select options, input information, or otherwise control the operation of the programming receiver 200. For example, the user interface 208 could be manipulated by an operator to skip a segment of interstitial content during playback of a set of recorded video content, thereby initiating a presentation of a single-screen combination of a picture advertisement associated with the segment of interstitial content that the user is attempting to skip, and a confirmation prompt used to verify that the user does, in fact, wish to skip over the segment of interstitial content without viewing it. In this example, the picture advertisement may include an ad for a product associated with a commercial the user is attempting to skip. In another example, the user interface 208 could be manipulated by an operator to change channels and record, play, and stop playback of video content.

The video content analysis module 210 is suitably configured to identify, during playback, content that is currently being displayed (e.g., broadcast television content or interstitial content interspersed throughout the television content). The video content analysis module 210 determines whether the current content is a segment of interstitial content or part of a television presentation, and then identifies the specific segment of interstitial content or television presentation by communicating with a preconfigured database of data associated with television content. The video content analysis module 210 is further configured to retrieve data associated with identified interstitial content and/or television presentations from the database, including but not limited to picture advertisements related to commercials.

The presentation module 212 is suitably configured to operate cooperatively with a display to present playback of recorded sequences of video content and interstitial content. The presentation module 212 is also configured to present picture advertisements (e.g., those retrieved by the video content analysis module 210 and the communication device 206) in place of a recorded segment of interstitial content when a user elects to skip the recorded segment of interstitial content. The presentation module 212 may cooperate with any type of display, such as a television, a computer monitor, a laptop computer display, a smart device display (e.g., a smartphone screen or tablet computer screen), or the like. The presentation module 212 may further cooperate with a particular software application (e.g., an "app") implemented on a smart device or computer to provide display data to a graphical user interface (GUI) in the app. In embodiments using a remote control app, the presentation module 212 is configured to display recorded sequences of video content and interstitial content via the GUI, in addition to graphical elements suitable for changing channels, controlling personal video recorder (PVR), digital video recorder (DVR), and/or remote storage DVR (RSDVR) recordings, viewing electronic program guide data, and/or other control functionality associated with video content control and playback.

In practice, the video content analysis module 210 and/or the presentation module 212 may be implemented with (or cooperate with) the at least one processor 202 to perform at least some of the functions and operations described in more detail herein. In this regard, the video content analysis module 210 and/or the presentation module 212 may be realized as suitably written processing logic, application program code, or the like.

Figure 3:
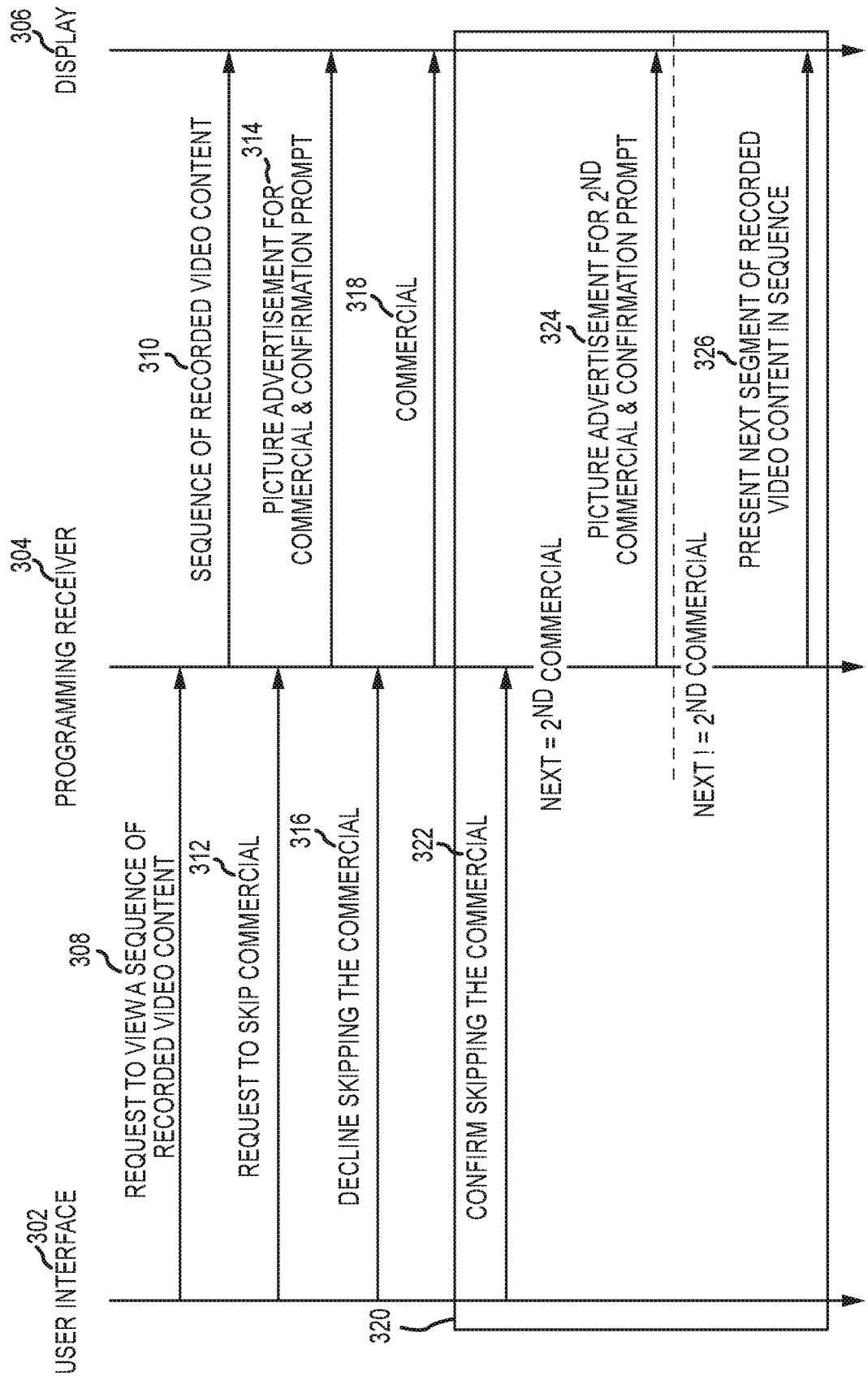
FIG. 3 is a timing diagram that illustrates an embodiment of a process for operation of an advertisement presentation system.

FIG. 3 is a timing diagram that illustrates an embodiment of a process 300 for operation of an advertisement presentation system. For purposes of this process 300, a user interface 302 receives user input to a programming receiver 304 and, in response to the user input, the programming receiver 304 provides data for presentation on a display 306. For ease of description and clarity, this example assumes that the programming receiver 304 is equipped with digital video recording (DVR) capabilities, and the programming receiver 304 stores and maintains a sequence of recorded video content. Further, the example presented by process 300 utilizes commercial content as the interstitial content interspersed throughout a sequence of recorded video content.

First, a user interface 302 of the programming receiver 304 provides, to the programming receiver 304, a request to view the sequence of recorded video content 308. Generally, the user interface 302 may be implemented using a hardware interface on the programming receiver 304, a graphical interface of a remote control software application, and/or an infrared remote control interface that is communicatively coupled to the programming receiver 304. A request to view a sequence of recorded video content 308 may include a user selection of a television show, movie, sporting event, or other recorded television content. In response to the request 308, the programming receiver 304 provides the sequence of recorded video content 310 to the display 306 for the user to view. The display may be implemented using a television screen, a device screen, and/or a graphical display for a remote control software application implemented on a device.

During the presentation of the sequence of recorded video content 310 by the display 306, the user interface 302 may provide a request to skip a commercial 312 to the programming receiver 304. In this case, a user has entered the request at the user interface 302, and in response, the programming receiver 304 presents a picture advertisement that is associated with the commercial that the user has requested to skip. Generally, the picture advertisement is a still-frame photograph, a single frame extracted from video content, a logo, a screenshot, an artistic rendering, or any other visual representation associated with the product presented in the commercial. In addition to the picture advertisement, the programming receiver 304 presents a prompt or question to the user, requesting confirmation that the user wishes to exclude the commercial from playback of the sequence of recorded video content 310.

When the picture advertisement and the confirmation prompt 314 are presented via the display 306, the user has the option to decline skipping the commercial 316 or to confirm skipping the commercial 322. When the user opts to decline skipping the commercial 316, the programming receiver 304 presents the commercial 318 via the display 306. Here, when the user presses the "skip", "hop", or "fast-forward" buttons on the user interface 302 to request skipping the commercial 312, the user may not know what commercial he is attempting to skip. The programming receiver 304 presents the picture advertisement 314 to inform the user of the particular commercial, and presents the confirmation prompt to ensure that the user wishes to exclude the specific commercial indicated by the picture advertisement.

When the user opts to confirm skipping the commercial 322, one of two potential scenarios may occur, as outlined by box 320. After receiving confirmation from the user to skip the commercial 322, the programming receiver 304 advances playback of the sequence of recorded video content past the skipped commercial, and to the next content item. The next content item may be another commercial (e.g., a second commercial), or the next segment of recorded video content in the sequence. As shown in the timing diagram, when the next content item is a second commercial, the programming receiver 304 presents a picture advertisement for the second commercial and a confirmation prompt 324 to skip the second commercial. As with the first commercial, the picture advertisement is related to the product being advertised in the second commercial. Here again, the user has the opportunity to confirm skipping the commercial (triggering the programming receiver 304 to advance the sequence of recorded video content again), or to decline skipping the commercial (triggering the programming receiver 304 to play the commercial).

However, when the next content item is not another commercial, the programming receiver 304 presents the next segment of recorded video content in the sequence 326. The next segment of video content in sequence is presented at its beginning point, and the commercial has been excluded from playback of the sequence of recorded video content in its entirety.

Figure 4B:
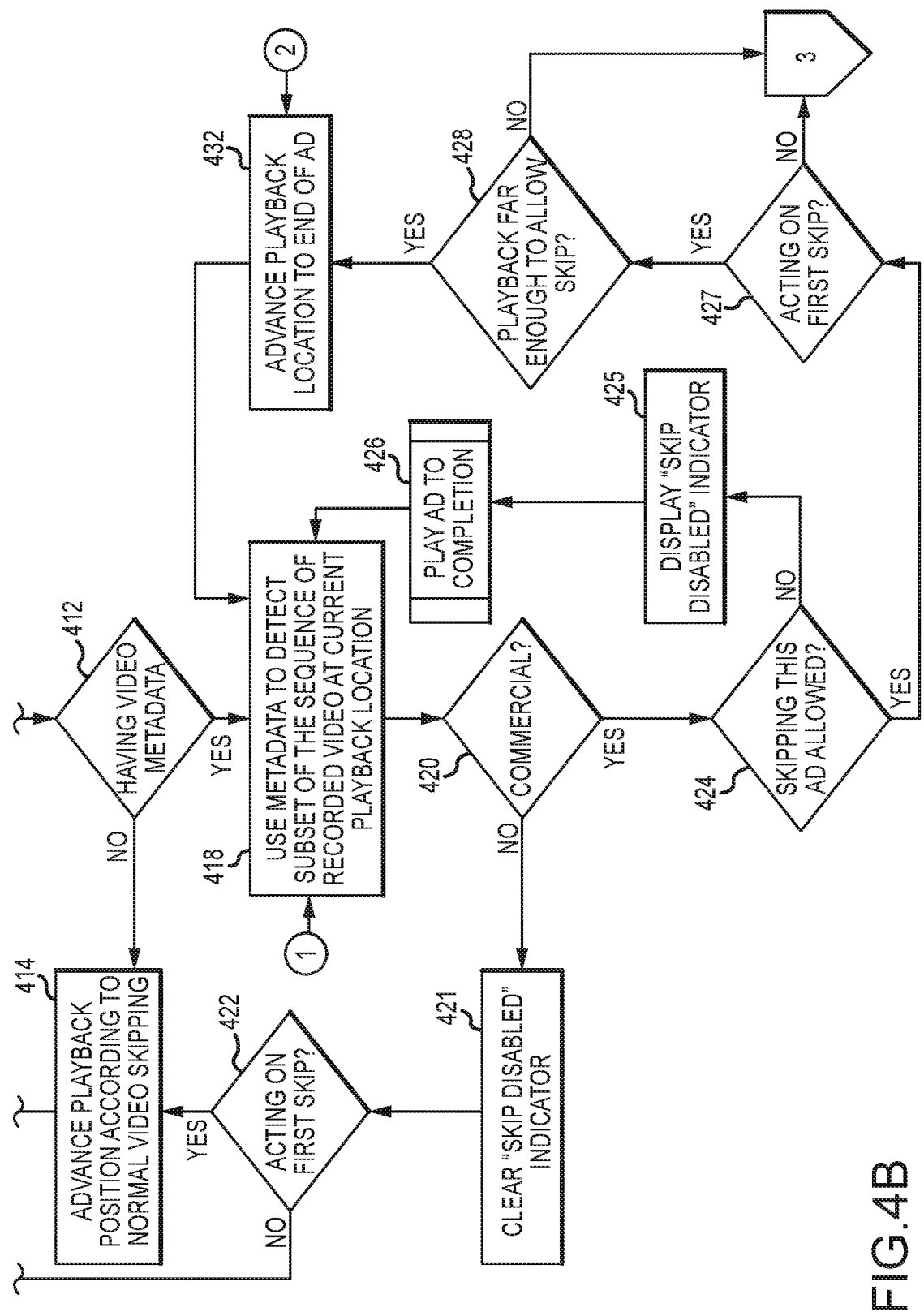
Figure 4C:
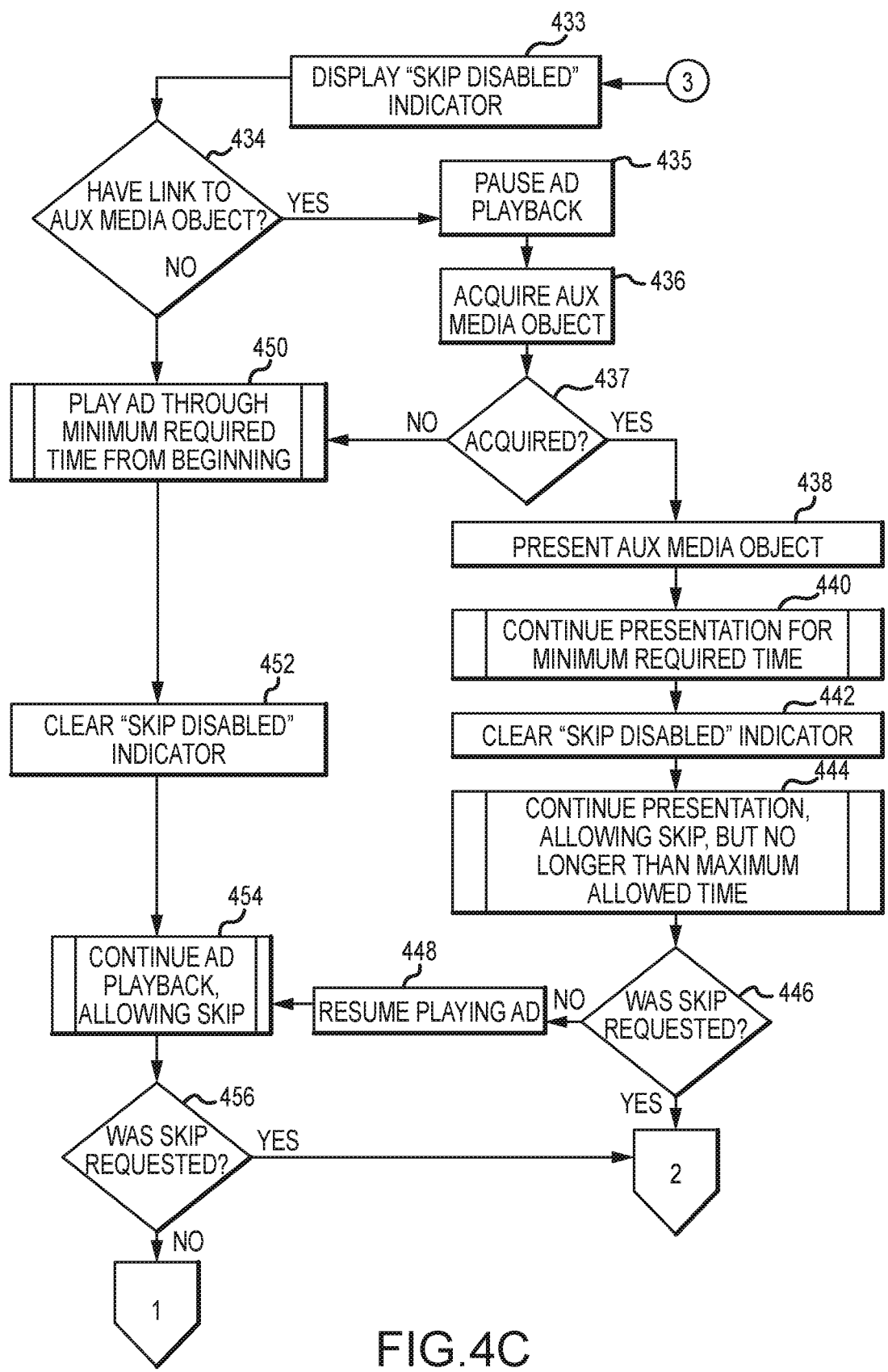

FIGS. 4A-4C is a flow chart that illustrates an embodiment of a process 400 for controlling skipping of commercials. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., a programming receiver and/or a disparately located server system in communication with the programming receiver. It should be appreciated that process 400 may include any number of additional or alternative tasks, the tasks shown in FIGS. 4A-4C need not be performed in the illustrated order, and process 400 may be incorporated into a more comprehensive procedure or process having additional functionality not described in detail herein. Moreover, one or more of the tasks shown in FIGS. 4A-4C could be omitted from an embodiment of the process 400 as long as the intended overall functionality remains intact.

First, the process 400 requests for playback of a sequence of recorded video content that includes a plurality of commercials (step 402). The sequence of recorded video content may include any recorded television show, movie, sports presentation, documentary, or any other television broadcast content that is interspersed with commercials or advertisements of any kind. The recorded video content may be recorded using a personal video recorder (PVR), a digital video recorder (DVR), a remote storage DVR (RSDVR), or any other method of recording and retaining video content for viewing at a later time. In this step, the process 400 begins during playback of the sequence of recorded video content.

Next, the process 400 optionally receives a server response (from a remotely-located server, see FIG. 1, reference 102) to the transmitted request, wherein the response includes metadata comprising details associated with the recorded video content and the plurality of commercials (step 404). The metadata may include, without limitation: a commercial start time in the sequence of video content; a commercial time duration or stop time; an indication of whether the commercial may be skipped; an indicator of whether a skip functionality is disabled; a link to an auxiliary media object; a minimum required presentation time of the auxiliary media object; a maximum allowed presentation time of the auxiliary media object with skip functionality enabled, following required presentation time; a minimum required playback time at the beginning of the advertisement or commercial is acting on the first skip; and a minimum required playback time at the beginning of the commercial if there is no auxiliary media object.

The process 400 then presents the video sequence, while optionally receiving the metadata in-band, or in other words, the metadata is received in a form synchronous with the video (step 406). In some embodiments, the process 400 receives the metadata out-of-band, or in other words, the metadata is received via an asynchronous push from the server (step 408).

The process 400 then receives a user request to skip video content during playback (step 410). The request may include activation of a fast-forward function, a timed-skip function, an "auto-hop" function, or any other user input command indicating that the user wishes to advance playback of recorded video content more quickly than standard playback. The fast-forward function may include playback-advancement at a multiple of the standard playback speed, and generally continues to advance the recorded video content as long as the user is pressing the fast-forward button on a programming receiver, pressing a button on an infrared remote control configured to control operation of a programming receiver, or selecting a graphical element of a remote control software application. The timed-skip function may advance playback by a predefined period of time when a button is selected via programming receiver, remote control, or remote control app, as described above. For example, a user may press a "30-second skip" button, and the recorded video content advances by thirty seconds. The "auto-hop" function may advance playback past a commercial advertisement that is part of the sequence of recorded video content. For example, the sequence of recorded video content may include a television show and a plurality of commercials. A user may select "auto-hop" when a segment of the television show ends and one of the commercials starts playing, and the "auto-hop" feature advances playback forward past the commercial. Playback then resumes after the end of the skipped commercial, and at the beginning of the next segment or the next commercial.

Next, the process 400 determines whether video metadata has been received (decision 412), which may include in-band metadata that is synchronous with the sequence of video content (described in step 406) or out-of-band metadata received as an asynchronous push from the remotely-located server (described in step 408).

When the video metadata has not been received (the "No" branch of 412), then the process 400 advances playback position according to normal video skipping (step 414). Normal video skipping may include any default skipping operation configured to occur when a skip request is received. For example, when a skip request is received, the process 400 may be configured to advance playback of the sequence of video content by thirty seconds, sixty seconds, one minute, or any other preprogrammed or default time period. As another example, a skip request may trigger the process 400 to advance playback by a particular number of video frames or other quantity of video content. The process 400 then continues playback (step 416) by presenting the video sequence at the location resulting from the received skip function, and optionally receiving video metadata associated with the video sequence in-band and synchronous with the video sequence (step 406).

However, when the video metadata has been received (the "Yes" branch of 412), then the process 400 uses the video metadata to detect a subset of the sequence of recorded video at the current playback location (step 418). The process 400 then determines whether the subset of the sequence of recorded video content at the current playback location is a commercial (decision 420), based on the received metadata.

Figure 5:
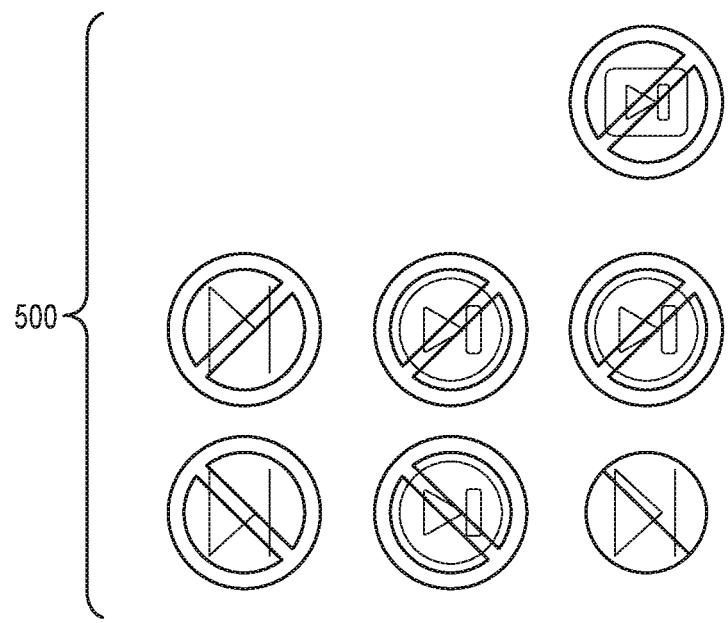
FIG. 5 is a diagram of a plurality of skip-disabled indicators, in accordance with the disclosed embodiments.

When the subset of the sequence of recorded video content at the current playback location is not a commercial (the "No" branch of 420), then the process 400 clears a "skip disabled" indicator (step 421) and determines whether the process 400 is acting on the first skip (decision 422). Here, the process 400 has determined that the currently-playing subset of the sequence of video content includes any video content that is not a commercial or advertisement. In some embodiments, the sequence of recorded video content is a television program and the process 400 determines that the currently-playing subset of the recorded video content is part of the television program and is not a commercial. The "first skip" is a first-received, user-entered skip request received by the process 400. A skip request is a user-entered request to advance the sequence of recorded video content by a predetermined amount of time and/or a predetermined quantity or time period associated with video content. A "skip disabled" function indicates that the user does not have the option of entering a skip request. Exemplary embodiments of "skip disabled" indicators 500 are shown in FIG. 5.

Returning to FIGS. 4A-4C, when the process 400 is acting on the first skip (the "Yes" branch of 422), then the process 400 advances the playback position according to normal video skipping procedures (step 414) and continues playback (step 416). Normal video skipping procedures may include any predetermined and/or pre-programmed quantity of video frames and/or time period used by the process 400 to advance the sequence of recorded video content. Here, because the process 400 has received a skip request from the user, the process 400 advances the sequence of recorded video content and continues playing the recorded video content from the point to which the recorded video content was advanced. However, when the process 400 is not acting on the first skip (the "No" branch of 422), then the process 400 does not advance playback in any way, and continues playback normally (step 416).

Returning to decision 420, when the subset of the sequence of recorded video content at the current playback location is a commercial (the "Yes" branch of 420), then the process 400 determines whether skipping this commercial (i.e., advertisement or "ad") is permitted (decision 424). When skipping the commercial is not permitted (the "No" branch of 424), the process 400 displays a "skip disabled" indicator (step 425) and then plays the commercial to completion (step 426) and then returns to step 418 to continue using metadata to detect the subset of the sequence of recorded video at the current playback location.

However, when skipping the commercial is permitted (the "Yes" branch of 424), the process 400 determines whether the process 400 is acting on the first skip (decision 427). When acting on the first skip (the "Yes" branch of 427), the process 400 determines whether the commercial has played sufficiently long enough to allow direct skip (decision 428). In certain embodiments, the commercial may be skipped after playing for a predefined period of time. The predefined period of time may be any amount of time, including zero seconds, one second, two seconds, ten seconds, and/or any other defined period of time. When the commercial has played for a sufficient period of time to allow a user to skip the commercial (the "Yes" branch of 428), the process 400 advances the playback location of the recorded video content to the end of the commercial (step 432) and returns to step 418 to use metadata to detect the subset of the sequence of recorded video content at the current playback location (step 418).

When the commercial has not played for a sufficient period of time to allow a user to skip the commercial (the "No" branch of 428) or when the process 400 is not acting on the first skip (the "No" branch of 427), the process 400 transitions to location (3) of the flow chart of FIG. 4C. Here, the process 400 displays a "skip disabled" indicator (step 433), and determines whether the process 400 has obtained a link to an auxiliary media object (decision 434) in the obtained metadata (see steps 406-408). The auxiliary media object may include a still-frame or animated picture or "slate" associated with a brand or product of the commercial, a.gif file or other type of moving icon associated with the brand or product of the commercial, or the like. In certain embodiments, the auxiliary media object may be received as part of the video stream and/or received as part of the metadata. In other embodiments, metadata may include an image, a pointer, a Uniform Resource Locator (URL) or other type of link to the auxiliary media object.

When the process 400 has obtained a link to an auxiliary media object (the "Yes" branch of 434), the process 400 pauses playback of the commercial or video advertisement (step 435) and acquires the auxiliary media object (step 436). The process 400 then confirms whether the auxiliary media object has been acquired (decision 437). When the auxiliary media object has not been acquired (the "No" branch of 437), the process 400 plays the commercial through the minimum required time from the beginning point of the commercial (step 450). However, when the auxiliary media object has been acquired (the "Yes" branch of 437), then the process 400 presents the auxiliary media object (step 438), continues presentation of the auxiliary media object for the minimum required time (step 440), clears the "skip disabled" indicator (step 442), and continues presentation of the auxiliary media object, while allowing skip functionality, but no longer than the maximum allowed time (step 444). In certain embodiments, the period of time may be any predefined, default period of time applied to the auxiliary media objects. In other embodiments, however, the period of time may be "ad-specific" or in other words, each commercial may be associated with a particular period of time to wait to receive a user request to skip the auxiliary media object.

The process 400 then determines whether a user-entered skip request has been received (decision 446). When a skip was not requested by a user, the process 400 resumes playing the commercial (step 448) and continues commercial playback while allowing skip functionality (step 454). When the process 400 has received a skip request, the process 400 returns to location (2) of FIG. 4B.

Returning to decision 434, when the process 400 does not have a link to an auxiliary media object (the "No" branch of 434), the process 400 continues playing the commercial or advertisement through a minimum required time period from the beginning of the commercial (step 450). The process 400 then clears the "skip disabled" indicator (step 452), continues commercial playback while allowing skip (step 454), and determines whether a skip request has been received (decision 456).

Here, when the process 400 receives a skip request (the "Yes" branch of 456), the process 400 continues to location (2) of FIG. 4B to advance the playback location to the end of the commercial (step 432) and then use received metadata to detect the subset of the sequence of recorded video content at the current playback location (step 418). However, when the process 400 has not received a skip request from the user (the "No" branch of 456), the process 400 proceeds to location (1) of FIG. 4B.

Figure 6:
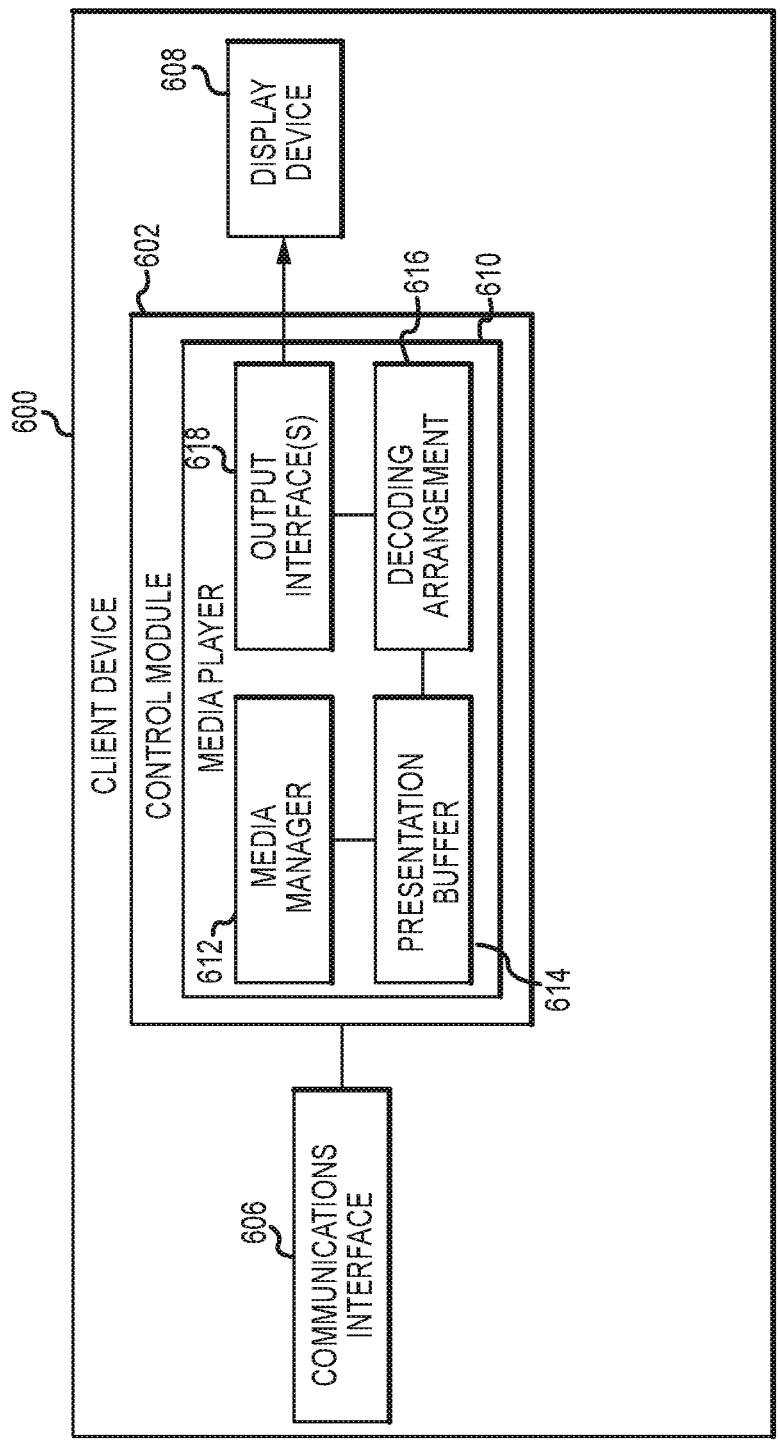
FIG. 6 is a block diagram of an exemplary embodiment of a client device suitable for use in the advertisement presentation system of FIG. 1.

FIG. 6 is a block diagram of an exemplary embodiment of a client device 600 suitable for use in the advertisement presentation system of FIG. 1. The illustrated client device 600 includes a control module 602, a communications interface 206 and a display device 208. The control module 602 executes, implements, or otherwise supports a media player 610 that receives encoded media segments from a network (e.g., network 108) via the communications interface 606 and generates corresponding audiovisual multimedia content on the display device 608, as described in greater detail below.

The communications interface 606 is coupled to the control module 602 and generally represents the hardware, circuitry, logic, firmware and/or other components of the client device 600 that are configured to support communications via a network (e.g., network 108). Depending on the embodiment, the communications interface 606 may include or otherwise be coupled to one or more wireless transceiver modules capable of supporting wireless communications, a cellular transceiver, a wired network interface controller (e.g., an Ethernet adapter), or another suitable network interface (e.g., a port that is adapted to receive a wireless adapter).

The display device 608 is coupled to the control module 602 generally represents a monitor, liquid crystal display (LCD), light emitting diode (LED) display, plasma display, television, or the like that graphically presents, renders, or otherwise displays imagery and/or video corresponding to streaming media content received by the client device 600 via the network. In some embodiments, the display device 608 may also generate sound or otherwise reproduce the audio corresponding to the audio portion of the media content, while in other embodiments, a separate audio output device (e.g., one or more headphones, speakers, or the like) may be utilized for reproducing audio. Additionally, it should be noted that while FIG. 6 depicts the display device 608 as being integrated with the client device 600, in some embodiments, the display device 608 may be physically distinct or otherwise separate from the client device 600. For example, the client device 600 may be realized as a set-top box (STB), satellite receiver, television receiver, or the like, in which case the display device 608 may be realized as a television or monitor connected to a video output interface of the client device 600.

The control module 602 represents the processing system, processing device, hardware, firmware, and/or other components or combinations thereof of the client device 600 configured to support the subject matter described herein. The control module 602 may include one or more processors, central processing units (CPUs), graphics processing units (GPUs), controllers, microprocessors, microcontrollers, processing cores and/or other computing resources. Some form of data storage or memory (not shown) is coupled to or otherwise accessed by the control module 602, which may include any sort of random access memory (RAM), read only memory (ROM), flash memory, magnetic or optical mass storage, or any other suitable configuration of non-transitory short or long term data storage or other non-transitory computer-readable media capable of storing data or other programming instructions for execution by the control module 602. The stored programming instructions, when read and executed by the control module 602, cause the control module 602 to generate a media player 610 that supports performance of the various tasks, functions, and/or processes and the operations of the client device 600 described herein. In some embodiments, the control module 602 is implemented as a "system on a chip" (SoC) that incorporates a hybrid microcontroller with memory, input/output and other features to perform the various processing and other functionality of client device 600, and in which case a separate memory element may not be provided.

The media player 610 implements or otherwise provides a media manager 612, a presentation buffer 614, a decoding arrangement 616, and one or more output interfaces 618. As described in greater detail below, the media manager 612 manages the selection of a content delivery source and the media segments requested therefrom, and stores or otherwise maintains the downloaded media segments in the presentation buffer 614. In this regard, the presentation buffer 614 generally represents a temporary data storage for the downloaded media segments, which may be implemented by the control module 602 or by a data storage element. For example, the presentation buffer 614 may be realized as a first in, first out (FIFO) buffer where downloaded media segments are ordered sequentially and deleted or otherwise removed after being retrieved by the decoding arrangement 616. The decoding arrangement 616 decodes or otherwise converts an encoded media segment retrieved from the presentation buffer 614 into corresponding signals provided to the output interface(s) 618 of the client device 600 for reproduction to a viewer or user. For example, the decoding arrangement 616 may include a video decoder to convert encoded video segments into corresponding video signals representative of the imagery for the video portion of a media program, which, in turn, is provided to a display interface 618 for reproducing the imagery on the display device 608. Similarly, the decoding arrangement 616 may also include an audio decoder to convert encoded audio segments into corresponding audio signals representative of the audio portion of the media program, which, in turn, is provided to an audio output interface 618. It should be appreciated that in embodiments where the display device 608 is also utilized for audio reproduction, the audio signals output by the audio decoder may be provided to the display device 608 in conjunction with the video signals output by the video decoder via a common interface 618.

Streaming Using Encoded Media Segments

Figure 7:
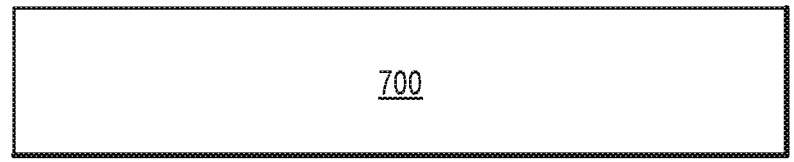
FIG. 7 depicts a schematic representation of a media content file.

FIG. 7 is a schematic representation of an exemplary media content file 700 corresponding to the media program to be streamed (e.g., multimedia content), which may be realized as an audio or video program, clip, segment, movie, or the like. The content file 700 may be distributed (e.g., to the origin content server 102) by a publisher or content source for purposes of broadcast or unicast distribution (e.g., via an advertisement presentation system 100). The actual subject matter of the content file 700 (although unimportant for purposes of this description) may comprise a television broadcast, sports event, movie, music, concert, etc. The content file 700 may be live or archived content. The content file 700 may comprise uncompressed video and audio, or alternatively, video or audio. Alternatively, the content file 700 may be compressed using standard or proprietary encoding schemes.

Figure 8:
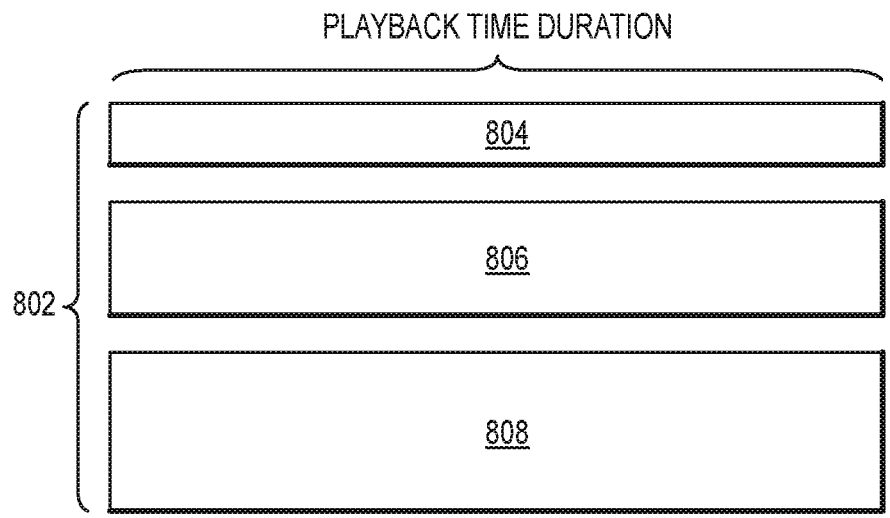
FIG. 8 depicts a schematic representation of media content streams corresponding to the media content file of FIG. 7 in one or more exemplary embodiments.

FIG. 8 is a schematic representation of a plurality of streams 802 having varying degrees of quality and bandwidth to support adaptive bitrate streaming. In one embodiment, the plurality of streams 802 comprises a low quality stream 804, a medium quality stream 806, and a high quality stream 808. Each of the streams 804, 806, 808 represents a copy or a version of the content file 700 (see FIG. 7) encoded and compressed to a different bitrate. For example, the low quality stream 804 may be encoded and compressed to a bitrate of 100 kilobits per second (kbps), the medium quality stream 806 may be encoded and compressed to a bitrate of 200 kbps, and the high quality stream 808 may be encoded and compressed to 600 kbps.

Figure 9:
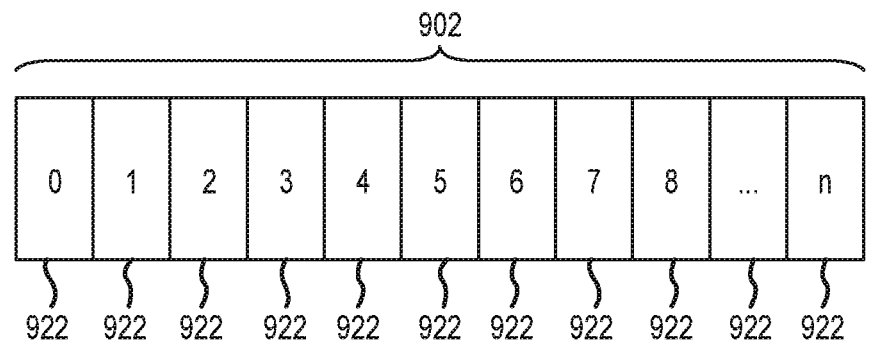
FIG. 9 is a schematic representation of a media content stream divided into a plurality of media segments.

FIG. 9 is a schematic representation of a media content stream 902 divided into a plurality of media segments (or streamlets) 922. As used herein, "media segment" refers to any sized portion of the content file 700. Each media segment 922 may comprise a portion of the content contained in the stream 902, encapsulated as an independent media object (or file), thereby allowing the streamlets 922 to be cached individually and to be independently playable by a media player. The content in a media segment 922 may have a unique time index in relation to the beginning of the content contained in the stream 902. In one embodiment, the content contained in each media segment 922 may have a duration of two seconds. For example, media segment 0 may have a time index of 00:00 representing the beginning of content playback, and media segment 1 may have a time index of 00:02, and so on. Alternatively, the time duration of the media segments 922 may be any duration that is less than the entire playback duration of the content in the stream 902. In a further embodiment, the media segments 922 may be divided according to file size instead of a time index and duration. In the context of a live event where the multimedia content is anchored to a particular point in time for playing the multimedia content, the media segments 922 may be indexed from or otherwise anchored to a particular point in time. The particular media segments 922 of multimedia content of a live event being streamed are played sequentially by a media player according to a schedule of the live event and then subsequently deleted. In practice, the media segments 922 may be stored as separate files on any one or more content delivery sources 110 in the advertisement presentation system 100 (e.g., on web servers, proxy caches, or other devices). The separate media segments 922 may be requested by a media player from a selected content delivery source using HTTP. That said, in alternative embodiments, the multimedia content may be stored in a single file that is divided into portions that can be cached using HTTP range requests.

Figure 10:
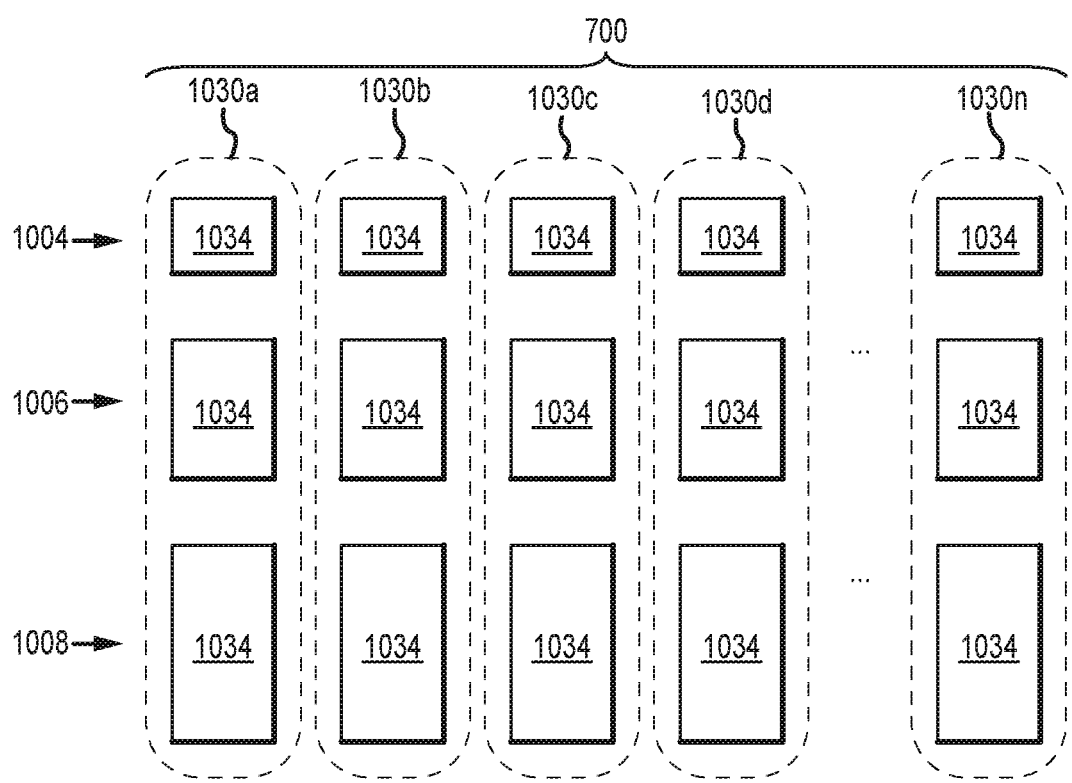
FIG. 10 is a schematic representation of encoded media segments corresponding to the media content streams of FIG. 8 corresponding to the media content file of FIG. 7 which are suitable for delivery in conjunction with the advertisement presentation system of FIG. 1 in one or more exemplary embodiments.

FIG. 10 is a schematic representation of encoded media segments corresponding to the media content file 700. FIG. 10 depicts different sets 1030 of media segments, where a "set" refers to a group of media segments having identical time indices and durations but varying bitrates. In the depicted embodiment, the set 1030a encompasses all media segments having a time index of 00:00. The set 1030a includes encoded media segments 1034 having low, medium, and high bitrates (identified by reference numbers 1004, 1006, 1008). Of course, each set 1030 may include more than the depicted three bitrates which are given by way of example only. One skilled in the art will recognize that any number of streams having different bitrates may be generated from the original content file 700.

As described above, the duration of one media segment 1034 may be approximately two seconds. Likewise, each set 1030 may comprise a plurality of media segments 1034 where each media segment 1034 has a playable duration of two seconds. Alternatively, the duration of a media segment 1034 may be predetermined or dynamically variable depending upon a variety of factors including, but not limited to, network congestion, system specifications, playback resolution and quality, etc. In the depicted embodiment, the content file 700 may be collectively formed of the plurality of sets 1030. The number of sets 1030 may depend on the length of the content file 700 and the length or duration of each media segment 1034.

Referring again to FIG. 6, a media player 610 may request portions of the multimedia content by requesting individual segments 1034 from a selected content delivery source (see FIG. 1, reference 110). In some embodiments, the media player 610 requests the segments 1034 according to a metadata descriptor file that indicates the current duration of the live multimedia content represented by the available segments 1034 to avoid requesting portions of the multimedia content that are not yet available for delivery. For example, the metadata descriptor file timestamp may indicate when the encoding process for a live media program started, and the number of segments 1034 available for delivery, from which the media player can determine that the content duration (live playout) and determine to request segments 1034 corresponding to the playback of the media program at that duration of time into the program or slightly before that point. In this regard, at times, the schedule of a live event changes, for example, the start time or duration of a live event may be changed in real time, or the timing of when advertisement breaks are scheduled to occur during the live event may change. Thus, the metadata descriptor file may be utilized to provide real-time or near real-time updates (e.g., updated content durations of the multimedia content indicating which portions of the content are available for delivery, advertisement markers for advertisements breaks in the multimedia content, and the like) to media players that are streaming multimedia content of a live event over a pull-based network HTTP to prevent media players from requesting multimedia content that is not yet available for delivery. Examples of how the metadata descriptor file or timeline of the live event can be updated and propagated to media players are described in U.S. patent application Ser. No. 12/508,449, which is incorporated by reference herein in its entirety.

The media manager 612 may receive the streaming multimedia content over the network (see FIG. 1, reference 108) as a sequence of segments 1034 for each of the time indexes of the media program, and then arrange the segments 1034 according to the time indexes. The media manager 612 may request and receive the files sequentially in time according to the time indexes, in an order that is not sequential in time, or receive one or more files concurrently. The media manager 612 may decide what segments 1034 to request based on any number of given constraints and/or preferences set by, for example, a viewer, the publisher, the web page designer, or constraints or preferences generated within the media player 610 (e.g., staging size or viewing window, the maximum and/or minimum acceptable video quality profile, the available video quality profiles, network performance measures, computational load measures, and the like). The media manager 612 then stages the downloaded segments 1034 according to their respective time indexes into a sequence of segments 1034 in the presentation buffer 614 in the order in which the segments 1034 should be decoded and rendered. As described above in the context of FIG. 6, the staged segments 1034 are then sequentially removed from the presentation buffer 614 and provided to the decoding arrangement 616, which converts the encoded media segments 1034 into corresponding audiovisual signals provided to the output interface 618 for reproducing the portion and duration multimedia content corresponding to a respective segment 1034 on the display device 608.

Figure 11:
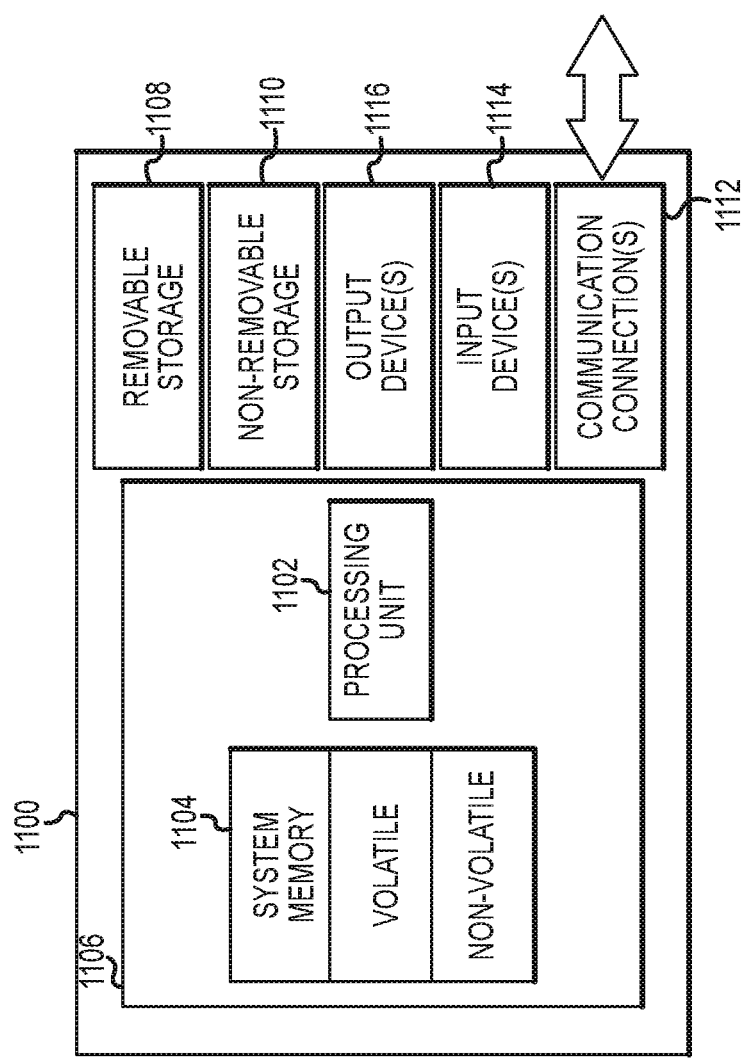
FIG. 11 is a simplified schematic representation of one exemplary embodiment of an RS-DVR system.

FIG. 11 depicts an exemplary embodiment of a RS-DVR system 1100 suitable for use as an RS-DVR system in the advertisement presentation system 100 of FIG. 1. The RS-DVR system 1100 is only one example of a suitable implementation and is not intended to suggest any limitation as to the scope of use or functionality of the RS-DVR systems 162. For example, although the RS-DVR system 1100 is depicted as a unitary component, a practical implementation may include a plurality of physical hardware components that cooperate in a distributed architecture.

The RS-DVR system 1100 and certain aspects thereof may be described in the general context of computer-executable instructions, such as program modules, executed by one or more processors or other devices. Generally, program modules include routines, programs, objects, components, data structures, and/or other elements that perform particular tasks or implement particular abstract data types. Typically, the functionality of the program modules may be combined or distributed as desired in various embodiments.

The RS-DVR system 1100 typically includes at least some form of computer readable media. Computer readable media can be any available media that can be accessed by the RS-DVR system 1100 and/or by applications executed by the RS-DVR system 1100. By way of example, and not limitation, computer readable media may comprise computer storage media that includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the RS-DVR system 1100.

Referring again to FIG. 11, in its most basic configuration, the RS-DVR system 1100 typically includes at least one processing unit 1102 and a suitable amount of memory 1104. The processing unit 1102 and the memory 1104 cooperate to provide the desired functionality, processing logic, and operating intelligence for the RS-DVR system 1100. Depending on the exact configuration and type of RS-DVR system 1100, the memory 1104 may be volatile (such as RAM), non-volatile (such as ROM, flash memory, etc.) or some combination of the two. The RS-DVR system 1100 may also include additional storage (removable and/or non-removable) including, but not limited to, magnetic or optical disks or tape. Such additional storage is illustrated in FIG. 11 by removable storage 1108 and non-removable storage 1110. The memory 1104, the removable storage 1108, and the non-removable storage 1110 are all examples of computer storage media as defined above.

The RS-DVR system 1100 may also contain communications connection(s) 1112 that allow the system 1100 to communicate with other devices on a network (e.g., network 110), such as the RS-DVR manager 160 or the client devices 120 shown in FIG. 1. The RS-DVR system 1100 may also include or communicate with input device(s) 1114 such as a keyboard, mouse or other pointing device, pen, voice input device, touch input device, etc. The RS-DVR system 1100 may also include or communicate with output device(s) 1116 such as a display, speakers, indicator lights, a printer, or the like.

Figure 12:
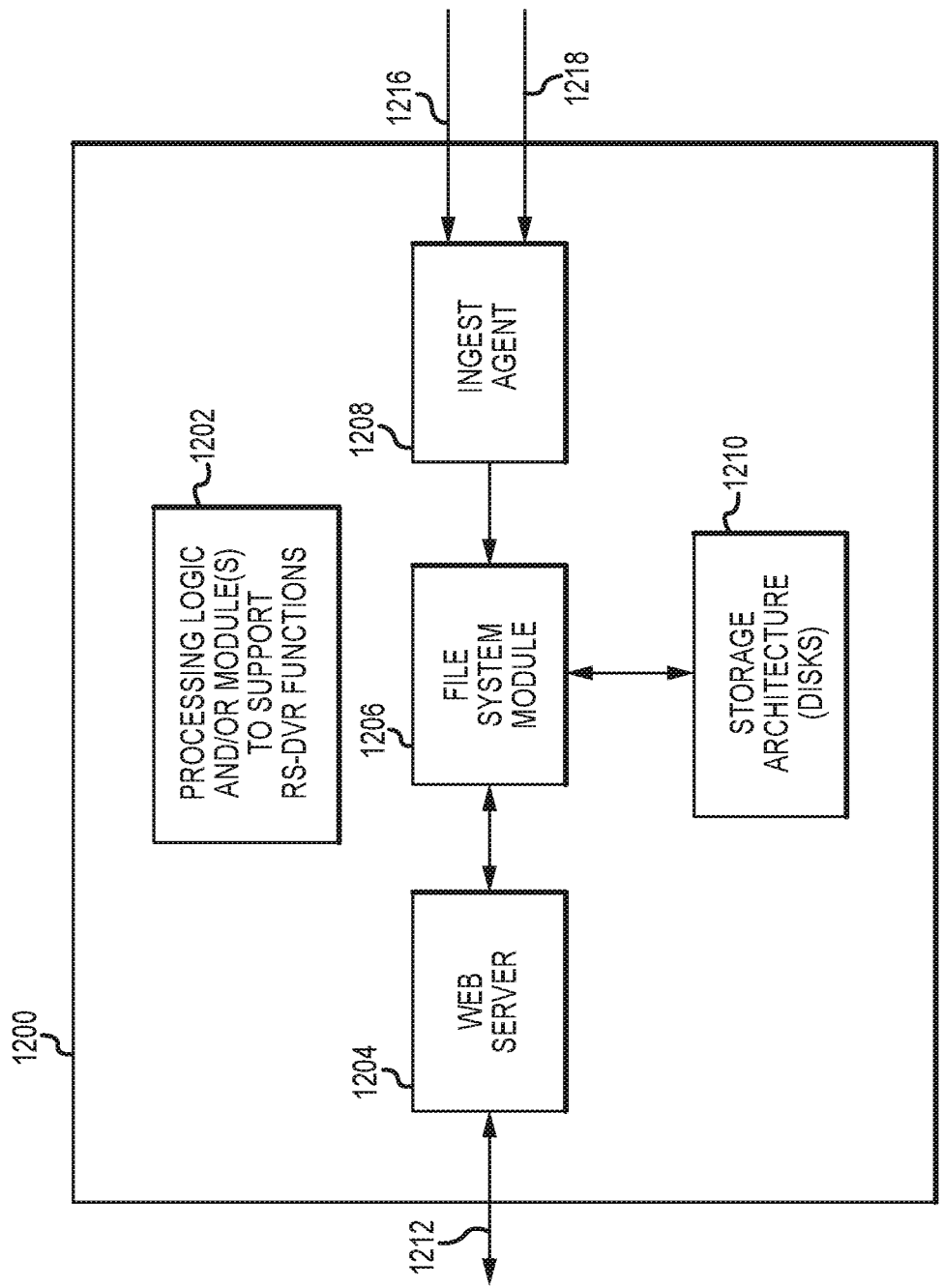
FIG. 12 is a schematic representation of another exemplary embodiment of an RS-DVR system.

FIG. 12 depicts another representation of an exemplary embodiment of an RS-DVR system 1200. FIG. 12 depicts some of the primary logical or functional modules of the RS-DVR system 1200. The illustrated embodiment of the RS-DVR system 1200 generally includes, without limitation: a processing logic module 1202, a network interface (which in this exemplary embodiment is realized as a web server 1204), a file system module 1206, an ingest agent 1208, and a storage architecture 1210 (which in this exemplary embodiment is realized as a plurality of memory storage devices such as hard disk drives). These elements cooperate to support the various functions and operations of the RS-DVR system 1200.

The processing logic module 1202 may cooperate with the web server 1204, the file system module 1206, the ingest agent 1208, and the storage architecture 1210 as needed during operation of the RS-DVR system 1200. Moreover, the processing logic module 1202 may be suitably configured to support one or more designated functions of the RS-DVR system 1200. In this regard, the processing logic module 1202 may include any desired functionality. For example, the processing logic module 1202 may be designed to include a content rights management module, a hard disk monitor module, a diagnostic module, or the like.

The web server 1204 (and/or any suitable network interface) represents hardware, software, firmware, and/or logic that is configured to communicate data between the RS-DVR system 1200 and another component or element such as a subscriber system. Referring to FIG. 1, the web server 1204 can be used to deliver media content to the programming receiver 104 via the network 108. The arrow 1212 in FIG. 12 represents the data communication link between the web server 1204 and the network 108. In certain embodiments, the web server 1204 cooperates with the file system module 1206 to provide media content files (in the form of encoded media segments) to oen or more programming receivers 104 in accordance with established HTTP techniques and methodologies.

The file system module 1206 is utilized to manage, organize, and maintain files in the storage architecture 1210. The file system module 1206 can accommodate multiple bitrate encoded media segments that are stored in a distributed manner across a plurality of hard disks of the storage architecture 1210. The file system module 1206 also cooperates with the ingest agent 1208 to accommodate the recording and storage of encoded media segments as needed during the operation of the RS-DVR system 1200. The ingest agent 1208 may be coupled to the file system module 1206 to receive encoded media segments that represent media content files encoded at a plurality of different bitrates. The ingest agent 1208 is capable of receiving multicast delivered media segments 1216 and/or unicast delivered media segments 1218 from an appropriate content source (e.g., the content source 110).

The storage architecture 1210 is coupled to the file system module 1206 to store encoded media segments that can be subsequently accessed for playback to one or more subscriber systems. In certain implementations, the storage architecture 1210 includes a plurality of memory storage devices such as hard disk drives. The memory storage devices are physically distinct and separate units that can be removed and replaced as needed. The file system module 1206 governs the manner in which the encoded media segments are stored in the different memory storage devices. The storage architecture 1210 of the RS-DVR system 1200 may include a shared storage architecture to store shared rights media content files, and a per-subscriber storage architecture to store per-subscriber rights media content files. In certain implementations, the shared storage architecture exclusively stores shared rights media content files without storing any per-subscriber rights media content files, and the per-subscriber storage architecture exclusively stores per-subscriber rights media content files without storing any shared rights media content files. Moreover, the shared storage architecture and the per-subscriber architecture are preferably realized as physically distinct and separated hardware devices, e.g., two separate hard disk drives, two separate disk drive enclosures, or the like. In this regard, the shared storage architecture may include buffers or other data storage that supports temporary storage of media segments for purposes of live streaming multimedia content to a plurality of client devices 600 and/or programming receivers 104, as described above. Thus, if the RS-DVR system 1200 determines that a media content file corresponding to live streaming requests should have shared rights, then the media content file is stored in the shared storage architecture of the RS-DVR system 1200. Conversely, recorded media content files may be stored in the per-subscriber storage architecture that exclusively stores media content files having per-subscriber rights. While the recorded media content files can be stored for any amount of time, in one or more embodiments, any shared media content files corresponding to live events are automatically deleted when the live event ends (e.g., there is no more additional multimedia content available from the content source 110 and/or the server system 102) or in the absence of receiving any streaming requests within a prescribed timeout period.

During operation, the processing logic module 1202, web server 1204, file system module 1206, ingest agent 1208, and storage architecture 1210 cooperate to carry out content recording, content file (media segment) storing, file management, disk management, content playback, and other functions of the RS-DVR system 1200. For the multiple bitrate implementations described herein, these elements of the RS-DVR system 1200 cooperate to provide stored media segments to the client devices 120 for presentation using at least one of the plurality of different available bitrates.

As described above, in exemplary embodiments, the advertisement presentation system 100 supports adaptive rate (or multiple bitrate) digital media content. Accordingly, the RS-DVR systems 162 are preferably configured to support the multiple bitrate scheme by recording a plurality of encoded video bit rates. In certain implementations, each subscriber has only one copy of the recorded content because the various bit rate versions of the same content are stored together in one logical file. As with traditional adaptive rate approaches, the video is split up into multi-second "media segments" and retrieved as HTTP objects.

The adaptive rate RS-DVR system can be implemented as a specialized web server that records and retrieves video files on behalf of any number of subscriber systems associated with one or more programming receivers 104. The RS-DVR system receives video from the audio/video content source 110 and/or the server system 102 or live stream encoders via either a multicast of the encoded media segments or via an HTTP GET request methodology. The RS-DVR system then immediately makes as many copies of the video as there are subscribers requesting to record the channel. Each subscriber has, in effect, their own area that contains their individual copies of the channel. Each subscriber can have different programs recorded on different RS-DVR systems—each individual recording is on only one server. On playback, the programming receiver 104 requests video from the appropriate RS-DVR system and specifies which individual subscriber is requesting it (so that the RS-DVR system can find the correct video copy). The video is returned to the requesting programming receiver 104 from the specialized web server, for example, using HTTP video objects marked as being non-cacheable to ensure that the personalized video copy is only delivered to the requesting subscriber system.

In accordance with certain exemplary embodiments, as soon as the video is encoded and sent to the RS-DVR system, it is immediately separated into per subscriber copies by being written multiple times into separate files in the file system. From then on the video remains separate and is only accessible by the individual subscriber that requested the recording. That said, as described above, for live streaming, the RS-DVR system may instead utilize a temporary copy of a recent portion of the live multimedia content for immediate streaming to multiple users.

An RS-DVR manager can be utilized to support a "cluster group" of RS-DVR systems. In practice, there can be multiple cluster groups with each having one or more RS-DVR systems. Depending on the particular system requirements, a cluster group may include up to hundreds of RS-DVR systems. A cluster group is used to provide scalability and creates certain types of failure resiliency.

Each cluster group may be configured to record a set of channels. At the time the subscriber is provisioned with their channel lineup, each subscriber is assigned to a cluster group for each channel that can be recorded on their behalf. In such embodiments, the RS-DVR manager may assign requests for live streaming multimedia content associated with a particular channel to a particular RS-DVR system that is already configured to record that channel.

In accordance with one implementation, the RS-DVR systems are deployed by MSOs close to the edge of their network, at roughly the same location where HTTP caching is provided. The RS-DVR systems would be deployed at that location because the content delivered by the RS-DVR systems is required to be "non-cacheable" and video delivery typically works better if the content comes from a system that is "close" to the subscriber.

An important consideration in planning on where to deploy RS-DVR cluster groups is the cost of the backhaul bandwidth. Every channel being recorded by the cluster group requires backhaul bandwidth for all of the bitrates, which suggests that the RS-DVR cluster groups should be centralized. However, with the streams being delivered to the subscriber from the RS-DVR systems being marked as non-cacheable, depending on how many subscribers there are at peak load times it could be better to locate the RS-DVR cluster groups closer to the subscriber, to avoid using backhaul bandwidth for subscriber playback. It is therefore recommended that the RS-DVR systems be deployed both centrally and at the edge with the centralized RS-DVR systems being utilized for content where the amount of bandwidth required for actual playback will be less than the bandwidth required to send the multiple copies down to the edge RS-DVR systems. The RS-DVR manager can use actual playback analytics in deciding where to assign particular recordings as well as where to assign live streaming requests, as described above.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method executed by a programming receiver that provides recorded video content to a viewer, the method comprising:
displaying, by the programming receiver, a sequence of the recorded video content comprising a video presentation and a plurality of segments of interstitial content, wherein each of the plurality of segments of interstitial content is bounded by advertisement markers;
receiving metadata associated with the sequence of recorded video content by the programming receiver, the metadata describing the advertisement markers of the plurality of segments, wherein the metadata is received prior to the segments bounded by the advertisement markers;
during playback of the sequence of recorded video content by the programming receiver, monitoring the current playback position to identify an upcoming advertisement marker corresponding to a commercial advertisement based upon the metadata;
when the upcoming advertisement marker is identified, the programming receiver pre-fetching and storing a plurality of auxiliary media objects for potential display, wherein the pre-fetching renders the auxiliary media objects immediately available for potential presentation in response to a subsequently received skip command from the viewer;
receiving, at the programming receiver, a command from the viewer to skip one of the plurality of segments of interstitial content comprising the commercial advertisement;
in response to the command from the viewer to skip one of the plurality of segments, the programming receiver immediately presenting, instead of the commercial advertisement, a screen comprising a first one of the previously stored auxiliary media objects that is associated with the one of the plurality of segments of interstitial content, the first one of the previously stored auxiliary media objects comprising a still-frame picture advertisement associated with the commercial advertisement, and the screen requesting confirmation to skip the commercial advertisement;
when the first one of the previously stored auxiliary media objects is displayed, the programming receiver beginning pre-fetching of a video ad stream associated with the first one of the previously stored auxiliary media objects for storage in a cache of the programming receiver in anticipation of subsequent user selection and viewing in response to a second command, wherein the video ad stream comprises the commercial advertisement; and
in response to the second command to skip the first one of the previously stored auxiliary media objects, the programming receiver:
discarding the pre-fetched video ad stream from the cache without playback of the pre-fetched video ad stream;
omitting playback of the one of the plurality of segments of interstitial content during displaying the sequence of recorded video content, based on the second command, by advancing a current playback location directly to an endpoint of the one of the plurality of segments of interstitial content; and
when a second one of the plurality of segments of interstitial content is next in the sequence of recorded video content, presenting a second screen requesting a second confirmation to skip the second one of the plurality of segments of interstitial content.

2. The method of claim 1, wherein, when a second one of the plurality of segments of interstitial content is not next in the sequence of video content, the method further comprises:
determining that a segment of the video presentation is next in the sequence of recorded video content; and
when the one of the plurality of segments of interstitial content is omitted, advancing the sequence during playback by presenting the segment.

3. The method of claim 1, further comprising:
in response to presenting the screen,
receiving a second command to decline skipping the one of the plurality of segments of interstitial content;
displaying the one of the plurality of segments of interstitial content, based on the second command; and
when a second one of the plurality of segments of interstitial content is next in sequence of the video content, presenting a second screen requesting confirmation to skip the second one of the plurality of segments of interstitial content.

4. The method of claim 3, wherein the second screen comprises a second auxiliary media object for the second one of the plurality of segments of interstitial content.

5. The method of claim 1, wherein the auxiliary media object comprises a logo for the one of the plurality of segments of interstitial content.

6. The method of claim 1, further comprising:
receiving a set of metadata associated with the sequence of recorded video content;
when the command is received, detecting a subset of the sequence of recorded video content currently being displayed;
extracting identifying data for the subset from the set of metadata;
determining that the subset is one of the plurality of segments of interstitial content, based on the identifying data;
extracting a link for the auxiliary media object from the set of metadata; and
obtaining the auxiliary media object, using the link.

7. A programming receiver, comprising:
system memory, configured to store a sequence of recorded video content and recorded commercials;

at least one processor, communicatively coupled to the system memory, the at least one processor configured to:
display a sequence of the recorded video content comprising a video presentation and a plurality of segments of interstitial content, wherein each of the plurality of segments of interstitial content is bounded by advertisement markers;
receive metadata associated with the sequence of recorded video content, the metadata describing the advertisement markers of the plurality of segments, wherein the metadata is received prior to the segments bounded by the advertisement markers;
during playback of the sequence of recorded video content by the programming receiver, monitor the current playback position based upon the metadata to identify an upcoming advertisement marker corresponding to a commercial advertisement;
when the upcoming advertisement marker is identified, pre-fetch and store a plurality of auxiliary media objects for potential display prior to the presentation of the identified upcoming commercial advertisement, wherein the pre-fetching renders the auxiliary media objects immediately available for potential presentation in response to a subsequently received skip command from the viewer;
subsequently receive the skip command from the viewer to skip one of the plurality of segments of interstitial content comprising the commercial advertisement;
in response to the subsequently received skip command, the programming receiver presenting, instead of the commercial advertisement, a screen comprising a first one of the previously stored auxiliary media objects that is associated with the one of the plurality of segments of interstitial content, the first one of the previously stored auxiliary media objects comprising a still-frame picture advertisement associated with the commercial advertisement, and the screen requesting confirmation to skip the commercial advertisement;
when the first one of the previously stored auxiliary media objects is displayed, the programming receiver pre-fetching a video ad stream associated with the first one of the previously stored auxiliary media objects and storing the pre-fetched video ad stream in a cache of the programming receiver for potential user selection and viewing, wherein the video ad stream comprises the commercial advertisement; and
in response to a second command to skip the first one of the previously stored auxiliary media objects, the programming receiver:
discarding the pre-fetched video ad stream from the cache without playback; and
omitting the one of the plurality of segments of interstitial content during displaying the sequence of recorded video content, based on the second command, by advancing a current playback location directly to an endpoint of the one of the plurality of segments of interstitial content; and
when a second one of the plurality of segments of interstitial content is next in the sequence of recorded video content, present a second screen requesting a second confirmation to skip the second one of the plurality of segments of interstitial content.

8. The programming receiver of claim 7, further comprising:
a user interface configured to:
receive the user command to skip the one of the recorded commercials; and
in response to presenting the screen, receive a confirmation command to skip the one of the recorded commercials;
wherein the at least one processor is further configured to omit the one of the recorded commercials during playback of the sequence, based on receiving the confirmation.

9. The programming receiver of claim 8, wherein the user interface comprises an infrared remote control.

10. The programming receiver of claim 8, wherein the user interface comprises a graphical user interface (GUI) presented by a remote control software application.

11. The programming receiver of claim 7, further comprising a communication device communicatively coupled to the at least one processor and a remote server, the remote server configured to store one or more auxiliary media objects associated with recorded commercials;
wherein the at least one processor is further configured to:
receive a set of metadata associated with the sequence of recorded content;
detect a currently displayed subset of the sequence of recorded video content and recorded commercials;
extract identifying data for the subset from the set of metadata;
determine that the subset is one of the recorded commercials, based on the identifying data;
extract a link for the auxiliary media object from the set of metadata; and
obtain the auxiliary media object, using the link.

12. The programming receiver of claim 7, wherein the auxiliary media object comprises a still-frame photograph associated with the product associated with the one of the recorded commercials in the sequence.

13. The programming receiver of claim 7, wherein the auxiliary media object comprises a logo for the product associated with the one of the recorded commercials in the sequence.

* * * * *